(12) United States Patent
Chien et al.

(10) Patent No.: US 11,642,635 B2
(45) Date of Patent: May 9, 2023

(54) CHEMICAL LIQUID DILUTION SYSTEM AND METHOD

(71) Applicant: TRUSVAL TECHNOLOGY CO., LTD., Zhunan Township (TW)

(72) Inventors: Shih-Pao Chien, Zhunan Township (TW); Yao-Tai Yang, Zhunan Township (TW); Chu-Chiao Kung, Kaohsiung (TW)

(73) Assignee: TRUSVAL TECHNOLOGY CO., LTD., Zhunan Township (TW)

( * ) Notice: Subject to any disclaimer, the term of this patent is extended or adjusted under 35 U.S.C. 154(b) by 714 days.

(21) Appl. No.: 16/594,673

(22) Filed: Oct. 7, 2019

(65) Prior Publication Data

US 2020/0289996 A1 Sep. 17, 2020

(30) Foreign Application Priority Data

Mar. 12, 2019 (TW) .................................. 108108286

(51) Int. Cl.
*B01F 23/451* (2022.01)
*F16L 41/02* (2006.01)
(Continued)

(52) U.S. Cl.
CPC ...... *B01F 23/451* (2022.01); *B01F 25/31242* (2022.01); *F16L 41/023* (2013.01);
(Continued)

(58) Field of Classification Search
CPC .......................... B01F 23/451; B01F 25/31242; B01F 23/483; B01F 2025/93; B01F 23/49; F16L 41/023; F16L 41/021; B01L 2300/0867
See application file for complete search history.

(56) References Cited

U.S. PATENT DOCUMENTS 1,878,478 A * 9/1932 Ensign .................... F23D 14/48
137/893
2,357,266 A * 8/1944 Malcolm ............... B01F 25/312
208/299
(Continued)

FOREIGN PATENT DOCUMENTS

CN 1214955 A 4/1999
CN 1302816 C 3/2007
(Continued)

OTHER PUBLICATIONS

Search report for CN201910225318.2, dated Mar. 11, 2022, Total of 1 page.
(Continued)

*Primary Examiner* — Matthew W Jellett
*Assistant Examiner* — Christopher D Ballman
(74) *Attorney, Agent, or Firm* — Apex Juris, PLLC; Hilde Coeckx; Tracy Heims (57) ABSTRACT

A chemical liquid dilution system includes a first material offering device providing fluid, a second material offering device, and a mixing device. The second material offering device provides liquid. The mixing device includes a fluid mixer, a first connection port, a second connection port, and an output port. The fluid mixer has a fluid limiting channel with an interface communicating with the first connection port and another interface communicating with the second connection port and the output port. The first connection port is connected to the first material offering device. The second connection port is connected to the second material offering device. After the fluid passes through the first connection port and the fluid limiting channel, the fluid and liquid are mixed up to form a diluted chemical liquid, and the output port discharges the diluted chemical liquid. A chemical liquid dilution method is also disclosed.

14 Claims, 12 Drawing Sheets

(51) Int. Cl.
*B01F 25/312* (2022.01)
*B01F 23/40* (2022.01)
*B01F 25/00* (2022.01)

(52) U.S. Cl.
CPC .............. *B01F 23/483* (2022.01); *B01F 23/49* (2022.01); *B01F 2025/93* (2022.01); *B01L 2300/0867* (2013.01); *F16L 41/021* (2013.01)

(56) References Cited

U.S. PATENT DOCUMENTS

| | | | | |
|---|---|---|---|---|
| 2,423,801 A * | 7/1947 | Sloan | .................. | E21B 21/062 138/44 |
| 2,569,857 A * | 10/1951 | Jaegle | ............... | B01F 25/31242 248/89 |
| 3,379,375 A * | 4/1968 | Walkling | ................. | F23Q 9/00 239/110 |
| 3,716,346 A * | 2/1973 | Greene | .................... | C01B 7/01 137/7 |
| 4,106,111 A * | 8/1978 | Rose | ................ | B01F 25/31242 366/124 |
| 4,416,610 A * | 11/1983 | Gallagher, Jr. | ....... | B01F 25/312 137/888 |
| 4,483,805 A * | 11/1984 | Glindsjo | ............. | B01D 53/501 261/78.2 |
| 4,615,352 A * | 10/1986 | Gibot | .................... | B22C 9/123 137/892 |
| 4,634,560 A * | 1/1987 | Eckert | .................. | B01F 25/312 261/78.2 |
| 4,738,614 A * | 4/1988 | Snyder | ................. | F23D 11/104 239/433 |
| 4,885,084 A * | 12/1989 | Doyle | ................... | C02F 3/1294 261/DIG. 39 |
| 4,913,192 A * | 4/1990 | Vavra | .................. | B01F 25/312 137/895 |
| 4,993,495 A * | 2/1991 | Burchert | ................ | B01F 25/31 261/DIG. 26 |
| 5,016,817 A * | 5/1991 | Ghate | ............... | B01F 35/71745 239/113 |
| 5,301,718 A * | 4/1994 | Bolhofner | ............... | B01F 25/31 137/526 |
| 5,311,907 A * | 5/1994 | Houck | ..................... | F15C 1/16 137/892 |
| 5,335,686 A * | 8/1994 | Isringhausen | ............. | F16T 1/34 137/883 |
| 5,398,712 A * | 3/1995 | Wang | ................... | B08B 9/0328 137/240 |
| 5,403,522 A * | 4/1995 | Von Berg | .......... | B01F 25/31242 261/36.1 |
| 5,409,310 A | 4/1995 | Owczarz | | |
| 5,427,151 A * | 6/1995 | Pauley | .............. | B01F 25/31242 417/189 |
| 6,157,774 A * | 12/2000 | Komino | ................. | B01F 35/93 392/387 |
| 6,162,021 A * | 12/2000 | Sarshar | .................. | E21B 43/00 417/174 |
| 6,682,057 B2 * | 1/2004 | La Crosse | ............. | B01F 25/312 261/76 |
| 6,986,506 B2 * | 1/2006 | Chapman | .......... | B01F 25/31242 261/76 |
| 6,994,276 B2 * | 2/2006 | Faye | ................ | H01M 8/04007 239/421 |
| 7,156,377 B2 * | 1/2007 | Chapman | ............ | B01F 25/3121 96/204 |
| 8,251,571 B2 * | 8/2012 | Imai | ...................... | B01F 23/451 366/165.2 |
| 8,573,243 B2 * | 11/2013 | Burnham | .......... | B01F 25/31242 137/317 |
| 8,591,095 B2 * | 11/2013 | Fanjat | .................. | G05D 11/138 366/132 |
| 8,807,158 B2 * | 8/2014 | Harris | ..................... | B01F 35/56 285/294.1 |
| 9,676,291 B2 * | 6/2017 | Haussmann | ....... | B60H 1/00278 |
| 9,931,601 B2 * | 4/2018 | Engelhard | ........... | B01F 23/2323 |
| 10,300,501 B2 * | 5/2019 | Morerod | ............... | B01F 25/231 |
| 10,420,924 B2 * | 9/2019 | Bolz | ..................... | F16L 41/023 |
| 10,625,221 B2 * | 4/2020 | Schneider | ............. | B01F 35/561 |
| 2003/0223307 A1 | 12/2003 | Nunez et al. | | |

FOREIGN PATENT DOCUMENTS

| | | |
|---|---|---|
| CN | 101185865 A | 5/2008 |
| CN | 105944545 A | 9/2016 |
| CN | 108999814 A | 12/2018 |
| JP | S6198527 U | 6/1986 |
| JP | 2008064019 A | 3/2008 |
| JP | 2013501164 A | 1/2013 |
| JP | 2014085261 A | 5/2014 |
| TW | 200532015 A | 10/2005 |
| TW | 201624163 A | 7/2016 |
| WO | 9509042 A1 | 4/1995 |
| WO | 2016042933 A1 | 3/2016 |

OTHER PUBLICATIONS

English abstract for CN108999814, Total of 1 page.
Search report for CN201910225318.2, dated Oct. 21, 2021, Total of 1 page.
English abstract for CN101185865, Total of 1 page.
English abstract for CN105944545, Total of 1 page.
English abstract for WO2016042933, Total of 1 page.
Office action for JP2020-006317, dated Sep. 21, 2021, Total of 2 pages.
Search report for TW109102332, dated Jun. 23, 2020, Total of 1 page.
English abstract of EP1504767, corresponding document of CN1302816, Total of 1 page.
English abstract for JP2008064019, Total of 1 page.
English abstract of WO2011015715, corresponding document of JP2013501164, Total of 1 page.
English abstract for JP2014085261, Total of 1 page.
English abstract for TW200532015, Total of 1 page.
Office action for JP2020-006317, dated Jan. 28, 2021, Total of 4 pages.
Examination report for TW108108286, dated Oct. 7, 2019, Total of 10 pages.
Search report for TW108108286, dated Oct. 7, 2019, Total of 1 page.
English abstract for corresponding document EP0911296 for CN1214955, Total of 1 page.
English abstract for TW201624163, Total of 1 page.

* cited by examiner

CHEMICAL LIQUID DILUTION SYSTEM AND METHOD

BACKGROUND OF THE INVENTION

Technical Field

The present invention generally relates to formulating chemical liquids, and more particularly to a chemical liquid dilution system and method.

Description of Related Art

In high tech realm, high purity chemical liquids with stable concentration are taken for use for manufacturing parts in high-tech products. Parts are like, for example, semiconductor chips, displays, touching screens and etc. These chemical liquids are usually diluted to a certain desired concentration with the involvement of huge amount of deionized water.

Generally, high concentration chemical liquids are diluted to lower concentration liquids on a gradual base, so that if liquids with further lower concentration are desired, such as concentration at ppm level, a huge amount of deionized water must be consumed. Due to the fact that the above described dilution method formulates abundant chemical liquid with low concentration at one single time, the concentration of the formulated liquid could have varied if not being run off in a short term, and that variation could have decreased the stability to the parts of high-tech products.

Furthermore, this conventional dilution method not only consumes too much deionized water, which in turn is a waste to water resources and energy, but also chews up too many filter materials. The method further exhibits a problem that it is unable to precisely formulate chemical liquid to a desired concentration, which ended up limiting the manufacture precision to the parts of high-tech products.

In sum, the conventional dilution method is in dire need to be improved.

BRIEF SUMMARY OF THE INVENTION

In view of the above, the primary objective of the present invention is to provide a chemical liquid dilution system and a method thereof, which could maintain a chemical liquid at a desired concentration for a long period, so that the stability of parts of high-tech products could be improved.

The present invention provides a chemical liquid diction system, including a first material offering device, a second material offering device and a mixing device. The first material offering device provides fluid, and the second material offering device provides liquid. The mixing device includes a fluid mixer, a first connection port, a second connection port, and an output port. The fluid mixer has a fluid limiting channel with one interface connected to the first connection port and the other interface connected to the second connection port and the output port. The first connection port is connected to the first material offering device, and the second connection port is connected to the second material offering device. After the fluid passes through the first connection port and the fluid limiting channel, the fluid mixes up with the liquid to form a diluted chemical liquid, and the output port discharges the diluted chemical liquid.

The present invention further provides a chemical liquid diction method, including provide a mixing device including a fluid mixer in which the fluid mixer includes a fluid mixer, a first connection port, a second connection port, and an output port, in which the fluid mixer has a fluid limiting channel with one interface connected to the first connection port and the other interface connected to the second connection port and the output port; inject a fluid through the first connection port of the mixing device; inject a liquid through the second connection port of the mixing device; mix the fluid with the liquid after the fluid passing through the first connection port and the fluid limiting channel of the fluid mixer, so to obtain a diluted chemical liquid; and discharge the diluted chemical liquid through the output port of the mixing device.

With the aforementioned design, lesser amount of deionized water is being used in the chemical liquid dilution system and method of the present invention. Further, pressure control and Venturi effect are also adopted for diluting chemical liquids to a certain desired concentration. In order to further dilute liquids to micro scale concentration (e.g., ppm level), a fluid mixer is employed in the present invention for fluid/liquid injection, mixing a small amount of the fluid with the liquid, so as to obtain chemical liquids with ppm level concentration. For one another aspect, the chemical liquid diction system and method of the present invention are capable of making chemical liquids formulated at a certain desired concentration to be maintained for a long period, so that to improve the stability of parts of high-tech products.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Reference will now be made in detail to the preferred embodiments of the present invention, examples of which are illustrated in the accompanying drawings. Wherever possible, the same reference numbers are used in the drawings and the description to refer to the same or like parts. It is not intended to limit the method by the exemplary embodiments described herein. In the following detailed description, for the purposes of explanation, numerous specific details are set forth in order to provide a thorough understanding of the disclosed embodiments. It will be apparent, however, that one or more embodiments may be practiced without these specific details. As used in the description herein and throughout the claims that follow, the meaning of "a", "an", and "the" may include reference to the plural unless the context clearly dictates otherwise. Also, as used in the description herein and throughout the claims that follow, the terms "comprise or comprising", "include or including", "have or having", "contain or containing" and the like are to be understood to be open-ended, i.e., to mean including but not limited to.

Figure 1:
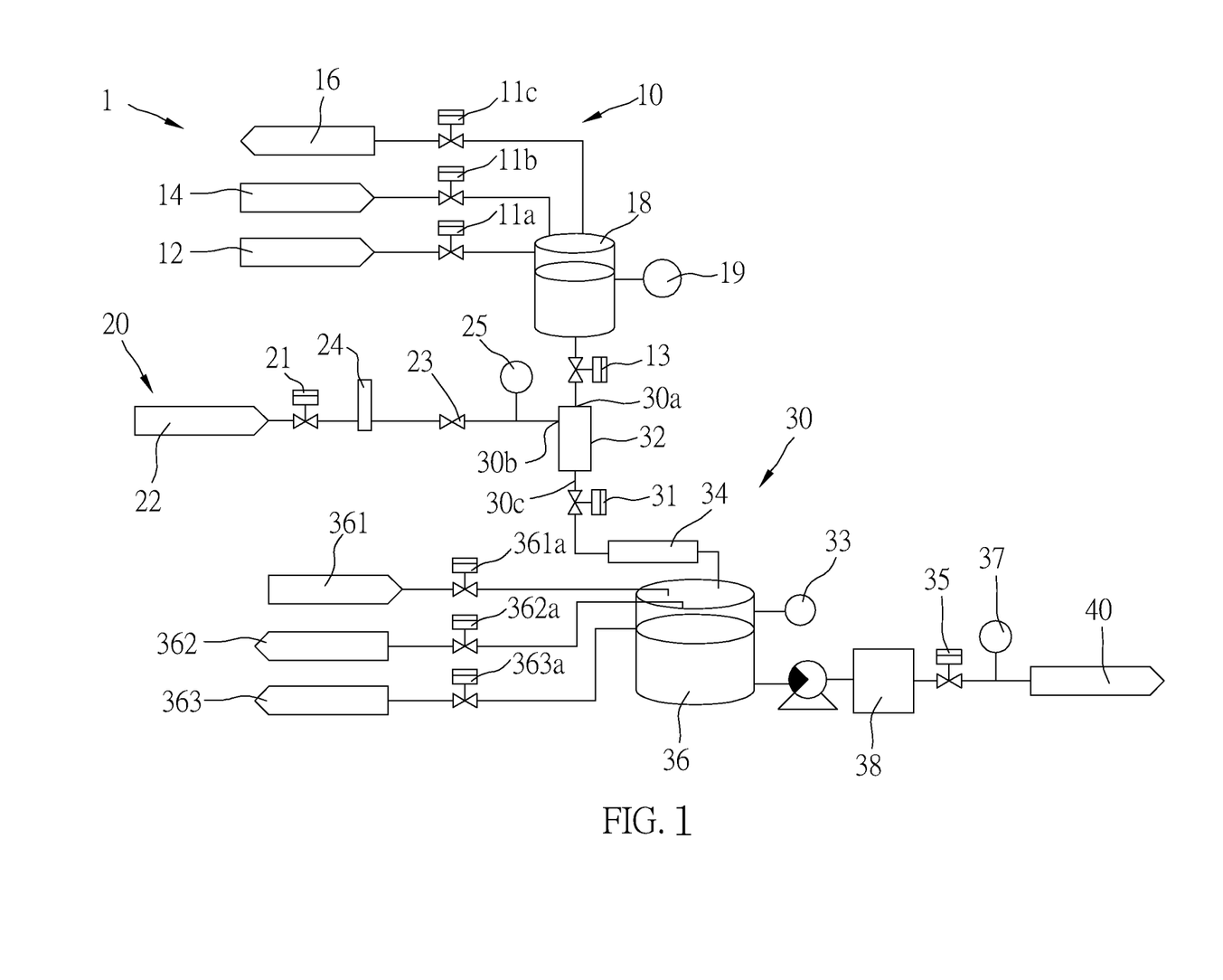
FIG. 1 is a schematic view of the chemical liquid dilution system according to an embodiment of the present invention.

Reference is first made to FIG. 1, which is a schematic view illustrating the chemical liquid dilution system of an embodiment in accordance with the present invention. The chemical liquid dilution system 1 as disclosed in the present invention could be used for, but not limited to, ammonia dilution. The chemical liquid dilution system 1 includes a first material offering device 10, a second material offering device 20, and a mixing device 30.

The first material offering device 10 includes a fluid supplier 12, a gas supplier 14, a gas discharging device 16, and a fluid concentrated tank 18. In the present embodiment, the first material offering device 10 further includes a mass flow controller (hereinafter MFC, not shown in the figure). For example, when the first material offering device 10 provides gas into the mixing device 30, the MFC could be employed to control the gas flow. Specifically, although MFC contributes to the stability of gas flow, if diluted liquid with ppm level concentration is desired such that MFC is unable to reach the goal for micro amount of gas. Therefore, a mixer having a fluid limiting channel is needed to achieve trace amount gas flow.

The fluid supplier 12 is connected to the fluid concentrated tank 18, and is configured to provide the tank 18 with the fluid. In the present embodiment, a regulating valve 11$a$ disposed between the fluid supplier 12 and the fluid concentrated tank 18 is used to control the flow of the fluid between the fluid supplier 12 and the fluid concentrated tank 18. The fluid could be, but not limited to, $NH_4OH$ or ammonia gas. Furthermore, the concentration of the $NH_4OH$ is between 25% and 35%, preferably 28% and 31%.

The gas supplier 14 is connected to the fluid concentrated tank 18, and is configured to provide the tank 18 with a non-active gas. In the present embodiment, a regulating valve 11$b$ disposed between the fluid supplier 14 and the fluid concentrated tank 18 is used to control the flow of the non-active gas between the fluid supplier 14 and the fluid concentrated tank 18. The non-active gas could be, but not limited to, $N_2$ or other inert gases.

The gas discharging device 16 is connected to the fluid concentrated tank 18, and is configured to discharge superfluous gases from the fluid concentrated tank 18. In the present embodiment, a regulating valve 11$c$ is disposed between the gas discharging device 16 and the fluid concentrated tank 18 for adjusting the pressure value of the gases in the fluid concentrated tank 18. In the present embodiment, the pressure value of the gases in the fluid concentrated tank 18 is measured by a pressure meter 19 installed on the fluid concentrated tank 18. Further, the pressure value is greater than 5 psi. By imposing high pressure to the fluid in the tank 18, the fluid is forced to be injected into the mixing device 30 from the fluid concentrated tank 18. A regulating valve 13 is used to control the flow of the fluid between the tank 18 and the mixing device 30.

The second material offering device 20 includes a liquid supplier 22 connected to the mixing device 30. The liquid supplier 22 is adapted to provide the mixing device 30 with liquids. In the present embodiment, multiple auxiliary devices could be installed between the liquid supplier 22 and the mixing device 30 to meet various demands of the second material offering device 20. Auxiliary devices could be, for example, but not limited to, a regulating valve 21, a regulating valve 23, a flow meter 24, and a pressure meter 25. Reference is again made to FIG. 1, the regulating valve 21 is installed between the liquid supplier 22 and the flow meter 24; the regulating valve 23 is installed between the flow meter 24 and the pressure meter 25; the pressure meter 25 is installed between the regulating valve 23 and the mixing device 30. In the present embodiment, by imposing pressure to the liquids in the liquid suppler 22, the liquids are forced to be injected into the mixing device 30 from the liquid supplier 22. The liquids could be, but not limited to, deionized water. In practice, the liquids could be other solvents depending on other practical requirements.

The mixing device 30 includes a fluid mixer 32, a first connection port 30$a$, a second connection port 30$b$, and an output port 30$c$. The first connection port 30$a$ is connected to the first material offering device 10, and the second connection port 30$b$ is connected to the second material offering device 20. After the fluids pass through the first connection port 30$a$ and the second connection port 30$b$, the fluids and liquids are mixed up in the mixing device 30 to form a diluted chemical liquid 40, and the mixed chemical liquids (i.e., the diluted chemical liquid 40) are then discharged from the output port 30$c$.

In the present embodiment, the mixing device 30 further includes a steady mixer 34, a mixing chemical liquid concentrated tank 36, and a conductivity meter 38. As shown in FIG. 1, the fluid mixer 32, the steady mixer 34, the mixing chemical liquid concentrated tank 36, and the conductivity meter 38 are, but not limited to, connected in series, while the connection could be adjusted or altered to meet different practical demands. In the present embodiment, a regulating valve 31 disposed between the fluid mixer 32 and the steady mixer 34 is used to adjust the flow of the diluted chemical liquid 40 between the fluid mixer 32 and the steady mixer 34. The mixing chemical liquid concentrated tank 36 is connected to a pressure meter 33, so that the pressure value in the mixing chemical liquid concentrated tank 36 could be measured. After the diluted chemical liquid 40 flows through the conductivity meter 38, the mixing device 30 could further include a regulating valve 35 and a pressure meter 37 by demands, so that the output flow of the diluted chemical liquid 40 could be adjusted by the regulating valve 35, and the output pressure value of the diluted chemical liquid 40 could be measured by the pressure meter 37.

It is noteworthy that, in the present embodiment, the mixing chemical liquid concentrated tank 36 is connected to a gas supplier 361, a gas discharging device 362, and a chemical liquid discharging device 363, as shown in FIG. 1. The gas supplier 361 is configured to provide the mixing chemical liquid concentrated tank 36 with a non-active gas. In the present embodiment, a regulating valve 361a disposed between the gas supplier 361 and the mixing chemical liquid concentrated tank 36 is used to regulate the flow of the non-active gas between the gas supplier 361 and the mixing chemical liquid concentrated tank 36. The non-active gas could be, but not limited to, $N_2$ or other inert gases.

In the present embodiment, the pressure value in the mixing chemical liquid concentrated tank 36 is measured by the pressure meter 33, so as to make sure that the pressure in the mixing chemical liquid concentrated tank 36 is maintained at a certain level, further to stabilize the concentration of the mixed chemical liquid 40. For example, when the pressure value in the mixing chemical liquid concentrated tank 36 is lower than a predetermined value, the gas supplier 361 provides the mixing chemical liquid concentrated tank 36 with the non-active gas to raise the pressure value in the mixing chemical liquid concentrated tank 36. Conversely, when the pressure value in the mixing chemical liquid concentrated tank 36 is higher than the predetermined value, the gas discharging device 362 connected to the mixing chemical liquid concentrated tank 36 discharges superfluous gases from the mixing chemical liquid concentrated tank 36. In the present embodiment, a regulating valve 362a disposed between the gas discharging device 362 and the mixing chemical liquid concentrated tank 36 is used to regulate the pressure value in the mixing chemical liquid concentrated tank 36 between the gas discharging device 362 and the mixing chemical liquid concentrated tank 36.

Moreover, the chemical liquid discharging device 363 communicates with the mixing chemical liquid concentrated tank 36, and a discharging port (not shown in the figure) of the chemical liquid discharging device 363 is disposed at a designated height in the mixing chemical liquid concentrated tank 36. For example, when the chemical liquids in the mixing chemical liquid concentrated tank 36 reach the designated height, superfluous chemical liquids could be discharged via the discharging port of the mixing chemical liquid concentrated tank 36. In the present embodiment, a regulating valve 363a disposed between the chemical liquid discharging device 363 and the mixing chemical liquid concentrated tank 36 is used to regulate the discharging of the chemical liquids between the chemical liquid discharging device 363 and the mixing chemical liquid concentrated tank 36.

Figure 2:
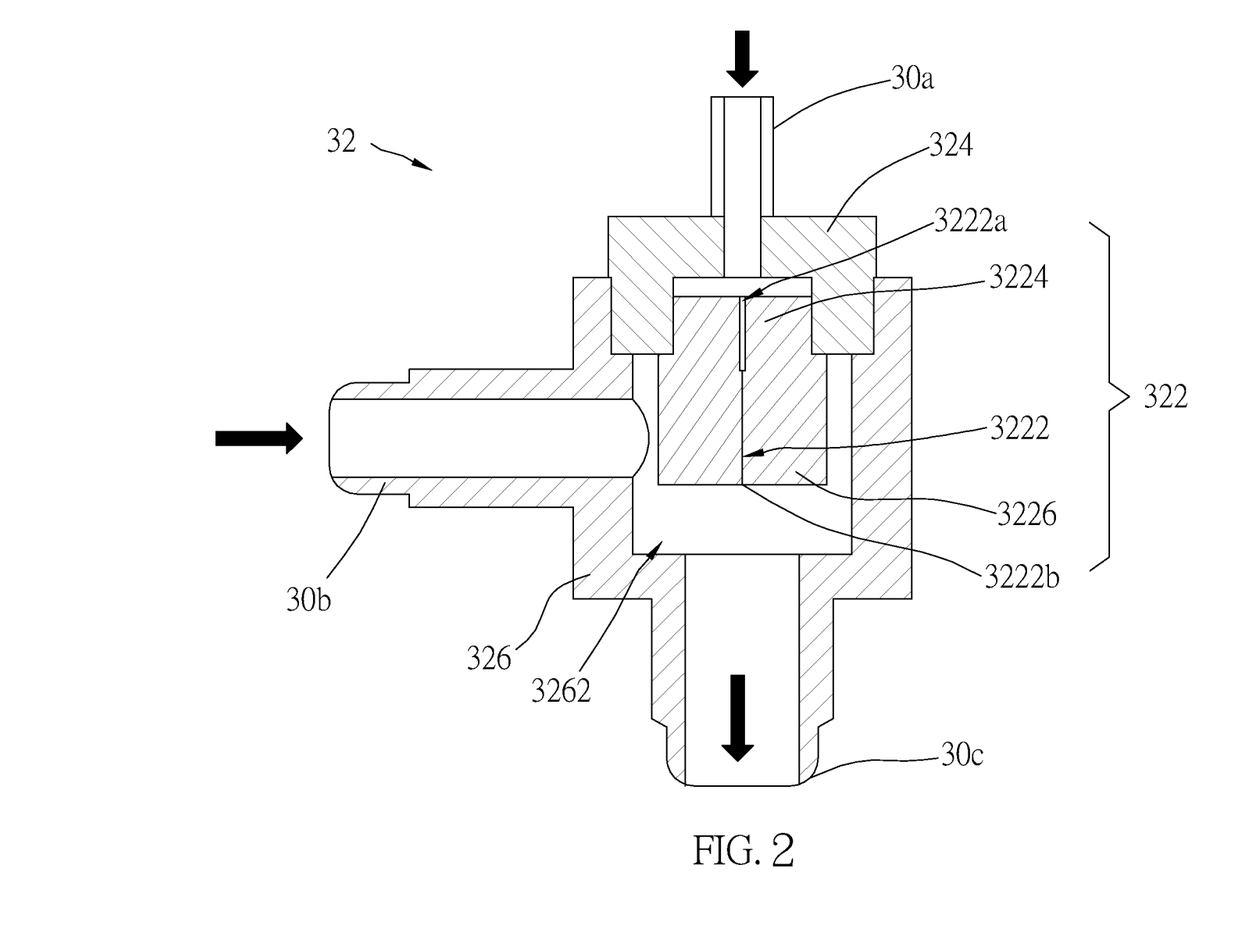
FIG. 2 is a sectional view illustrating the fluid mixer according to the embodiment of the present invention.
Figure 3:
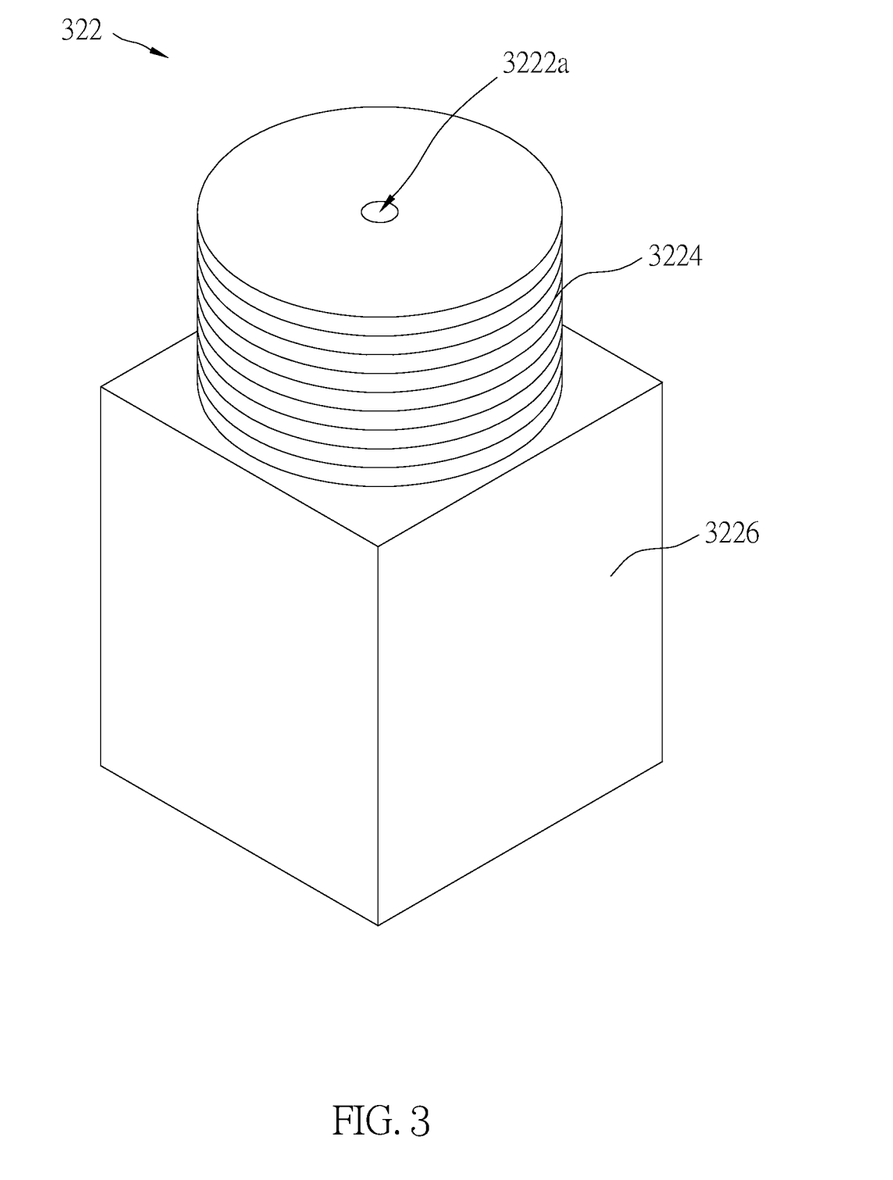
FIG. 3 is a perspective view illustrating the connection member according to the embodiment of the present invention.
Figure 4:
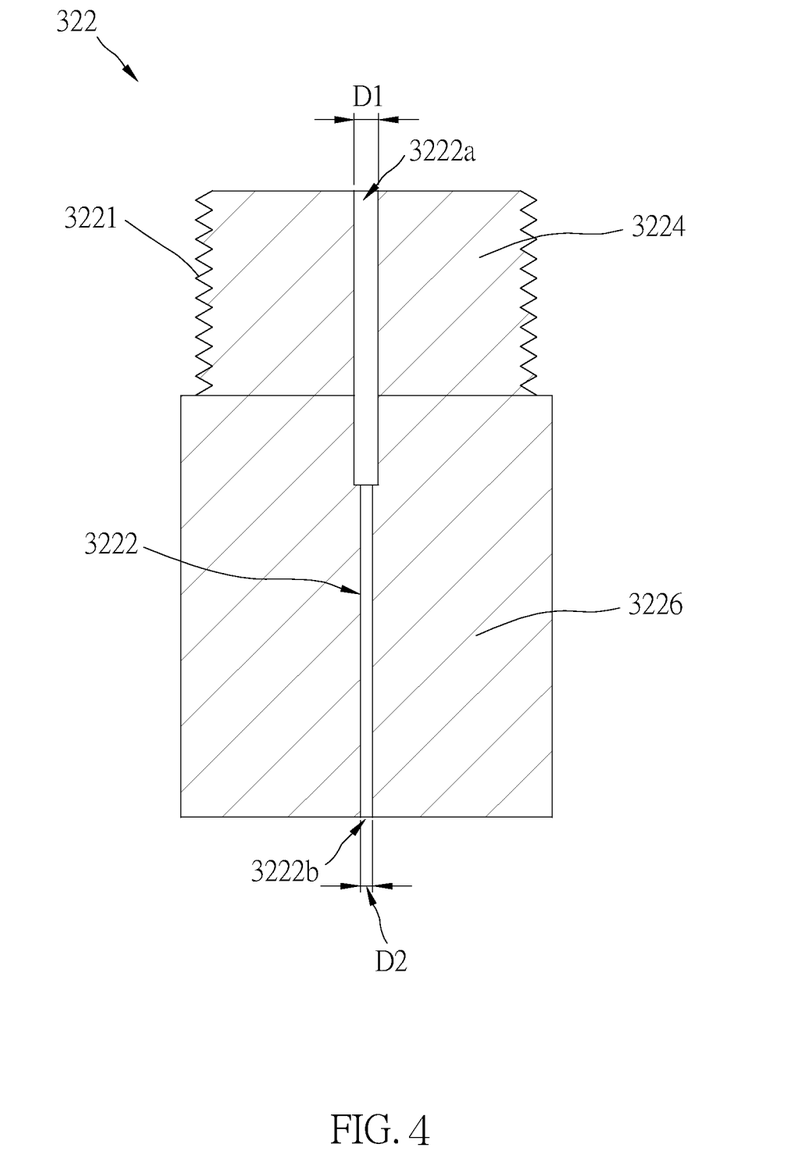
FIG. 4 is a sectional view illustrating the connection member according to the embodiment of the present invention.
Figure 5:
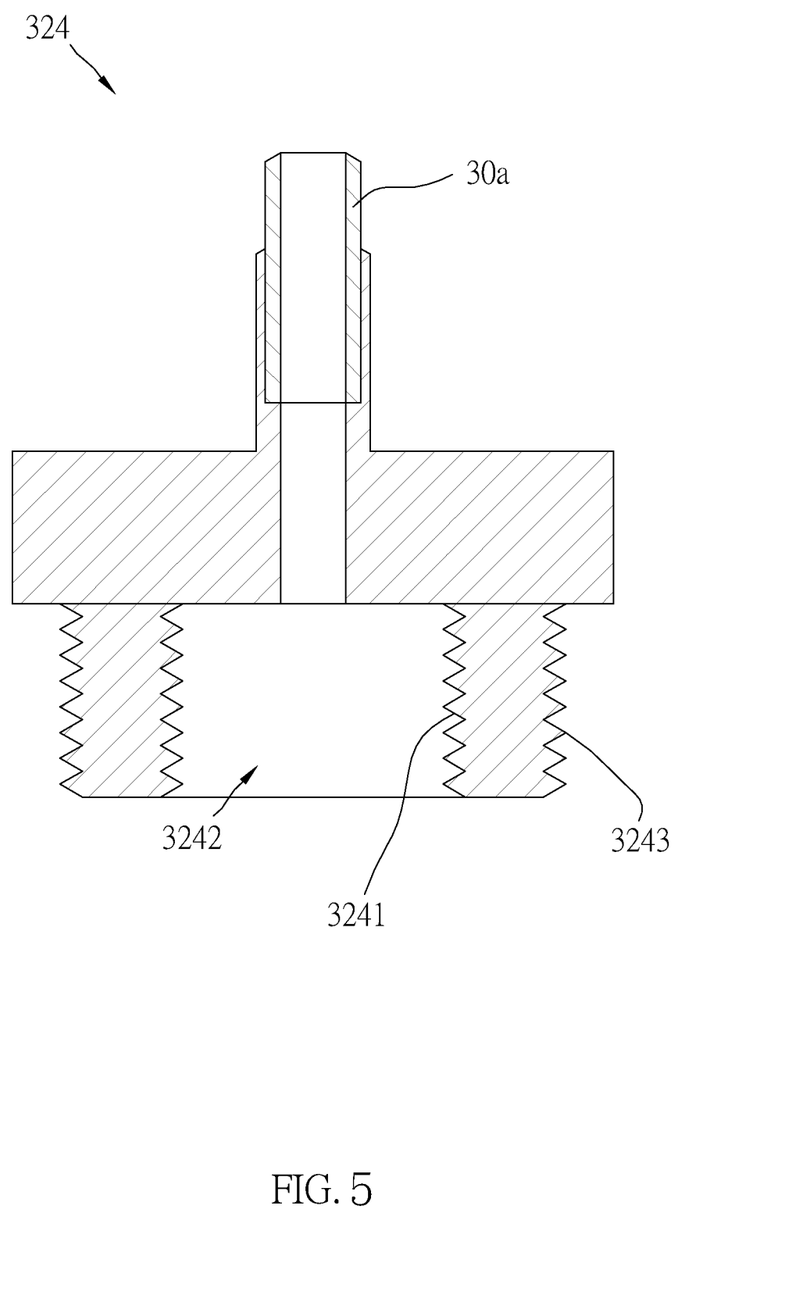
FIG. 5 is a sectional view illustrating the connection cover according to the embodiment of the present invention.
Figure 6:
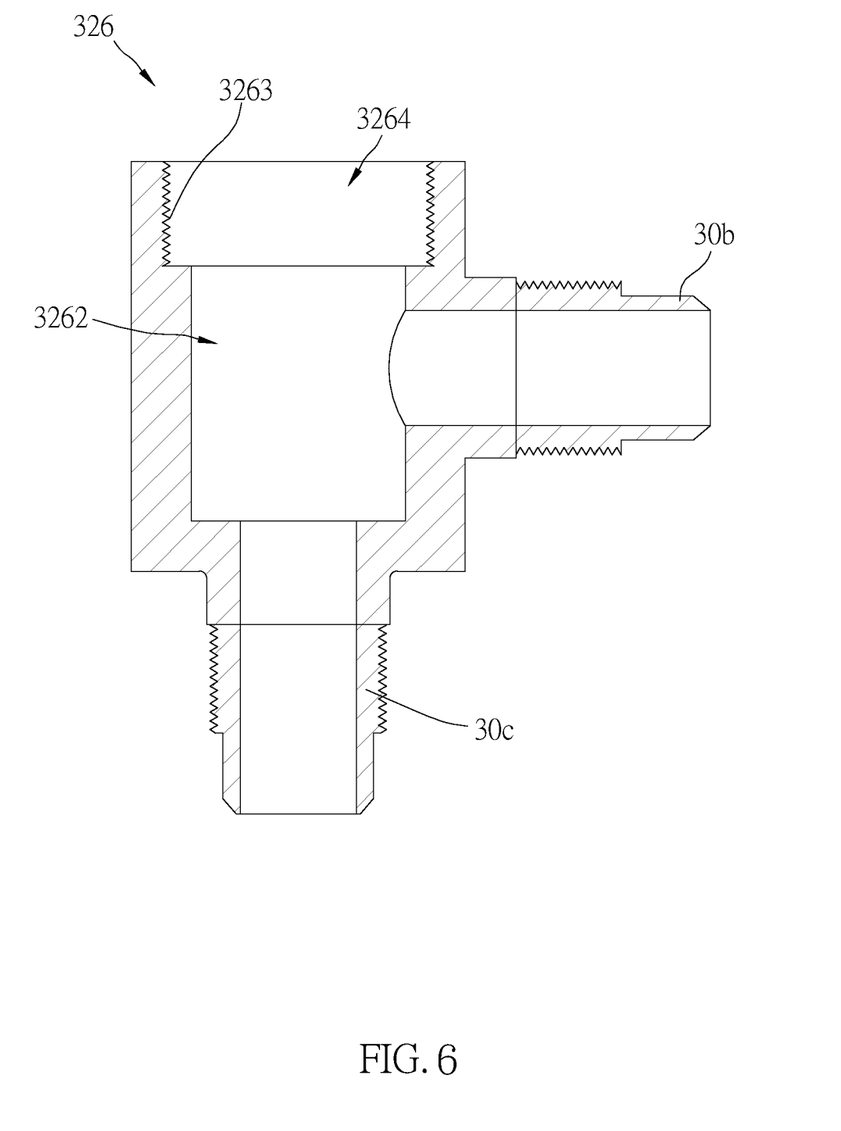
FIG. 6 is a sectional view illustrating the Y-shaped connector according to the embodiment of the present invention.

Reference is next made to FIG. 2. the fluid mixer 32 includes a connection member 322, a connection cover 324, and a Y-shaped connector 326. The connection cover 324 is respectively connected to the connection member 322 and the Y-shaped connector 326, and the first connection port 30a is on the connection cover 324. The Y-shaped connector 326 has the second connection port 30b, the output port 30c, and a cavity 3262, wherein the second connection port 30b, the output port 30c, and the cavity 3262 communicate with one another.

The connection member 322 has a fluid limiting channel 3222, an input port 3224, and an output port 3226. An interface 3222a of the connection member 322 communicates with the first connection port 30a, and the other interface 3222b communicates with the second connection port 30b and the output port 30c. In the present embodiment, the connection member 322 is connected to the connection cover 324 through the input port 3224, and the output port 3226 of the connection member 322 is in the cavity 3262 of the Y-shaped connector 326. In the present embodiment, a portion of the connection cover 324 is located between the connection member 322 and the Y-shaped connector 326. The second connection port 30b is respectively perpendicular to the first connection port 30a and the output port 30c. The fluid limiting channel 3222 is, but not limited to, a pinhole channel as an example. The interface 3222a of the fluid limiting channel 3222 has a first diameter D1, and the other interface 3222b has a second diameter D2, wherein the first diameter D1 is greater than the second diameter D2. In the present embodiment, the range of the second diameter D2 is between 0.01 mm and 0.1 mm. Preferably, the range of the second diameter is between 0.04 mm and 0.07 mm. Since the fluid limiting channel 3222 is a relatively narrower channel compared to the interface 3222a and the other interface 3222b, the fluid limiting channel 3222 in the mixing derive 32 draws the first liquid into the second liquid under the affection of Venturi effect. With the pressure difference between the first and second connection ports, the purpose of controlling the diluted chemical to reach the desired conductivity and concentration could be achieved.

Reference is next made to FIGS. 3-6. The input port 3224 of the connection member 322 is in cylindrical shape. The connection cover 324 has an inner round slot 3242. The input port 3224 of the connection member 322 is correspondingly connected to the inner round slot 3242 of the connection cover 324. In the present embodiment, the input port 3224 of the connection member 322 has an external screw thread 3221, and the inner round slot 3242 of the connection cover 324 has an internal screw thread 3241. The input port 3224 is connected to the inner round slot 3242 by, but not limited to, screwing the external screw thread 3221 with the internal screw thread 3241. In practice, the input port 3224 and the inner round slot 3242 could be connected together by other means, such as being buckled by turning.

In the present embodiment, the output port 3226 of the connection member 322 is, but not limited to, a square post. In practice, the output port 3226 of the connection member 322 could be in cylindrical shape as well. In the present embodiment, the output port 3226 of the connection member 322 corresponds to the second connection port 30b of the Y-shaped connector 326 via an angle or a surface among the four of the square post, but not limited thereto. However, in practice, no matter one of the four angles or one of the four surfaces of the square post corresponds to the second connecting portion 30b of the three-way pipe body 326, the result of the mixed chemical liquid formulation will not be affected.

The connection cover 324 has an outer round wall, and the Y-shaped connector 326 has an inner round opening 3264, wherein the outer round wall of the connection cover 324 is correspondingly connected to the inner round opening 3264 of the Y-shaped connector 326. In the present embodiment, the outer round wall of the connection cover 324 has an external screw thread 3243, and the inner round opening 3264 of the Y-shaped connector 326 has an internal screw thread 3263. The outer round wall is connected to the inner round opening 3264 by screwing the external screw thread 3243 with the internal screw thread 3263, but not limited thereto. In practice, the outer round wall and the inner round opening 3264 could be connected together by other means, such as being buckled by turning.

In the present embodiment, the liquids in the fluid concentrated tank 18 are imposed with high pressure, forcing the liquids to be injected into the mixing device 30 from the fluid concentrated tank 18. The pressure value P1 of the liquids could be measured by the pressure meter 19. Further, by imposing pressure to the liquids in the liquid supplier 22, the liquids in the supplier 22 could be forced to flow into the mixing device 30, and the pressure value P2 of the liquids could be measured by the pressure meter 25. In addition, the conductivity of the diluted chemical liquid 40 could be measured by the conductivity meter 38.

Figure 7:
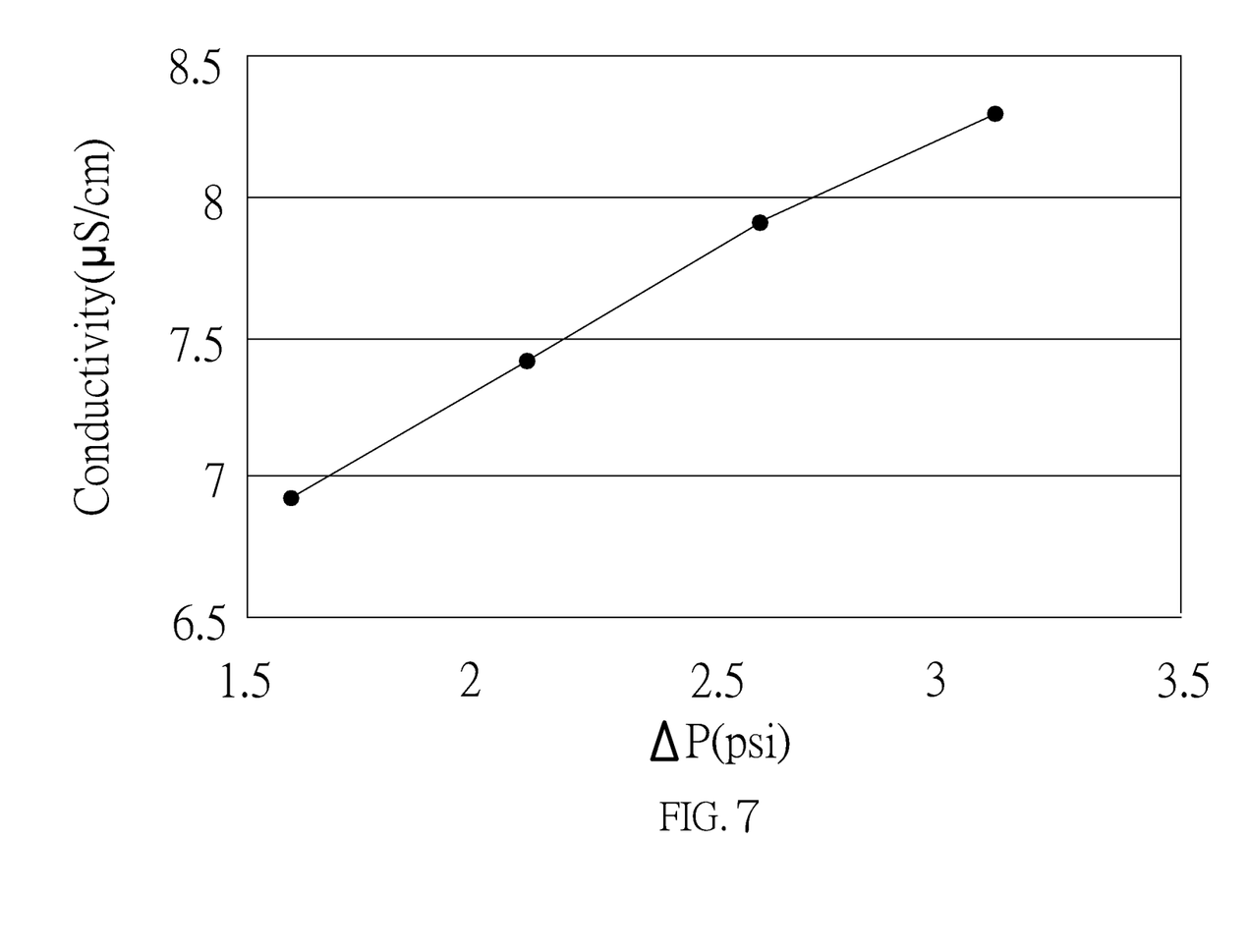
FIG. 7 is a schematic view illustrating the conductivity of ammonia solution relating to pressure difference.

Reference is next made to FIG. 7, which is relationship drawing illustrating the pressure difference ($\Delta P = P1 - P2$) of the fluid and liquid with respect to the conductivity of the diluted chemical liquid 40. It can be seen form FIG. 7 that the pressure difference ($\Delta P = P1 - P2$) and the conductivity are in linear relationship. Due the linearity, the pressure difference ($\Delta P = P1 - P2$) of the fluid and liquid could be adopted to control the conductivity of the diluted chemical liquid 40. Moreover, it is known that the conductivity of the diluted chemical liquid 40 and the concentration of the liquid are in positive correlation, so that the concentration of the liquid in the conductivity of the diluted chemical liquid 40 could be controlled by utilizing the pressure difference ($\Delta P = P1 - P2$) of the fluid and liquid. It is noteworthy that, in addition to pressure difference ($\Delta P = P1 - P2$) of the fluid and liquid, the pressure value of the gas in the mixing chemical liquid concentrated tank 36 could also affect the concentration of the fluid in the diluted chemical liquid 40, therefore, the mixing chemical liquid concentrated tank 36 of the present embodiment is designed as previously described, that is, the pressure value of the gas in the mixing chemical liquid concentrated tank 36 could be maintained at a certain value by the gas supplier 361 and the gas discharging device 362. Moreover, by discharging superfluous mixed chemical liquid 40 in the mixing chemical liquid concentrated tank 36 via the chemical liquid discharging device 363, the concentration of the liquid in the chemical liquid 40 could be preciously maintained.

Figure 8:
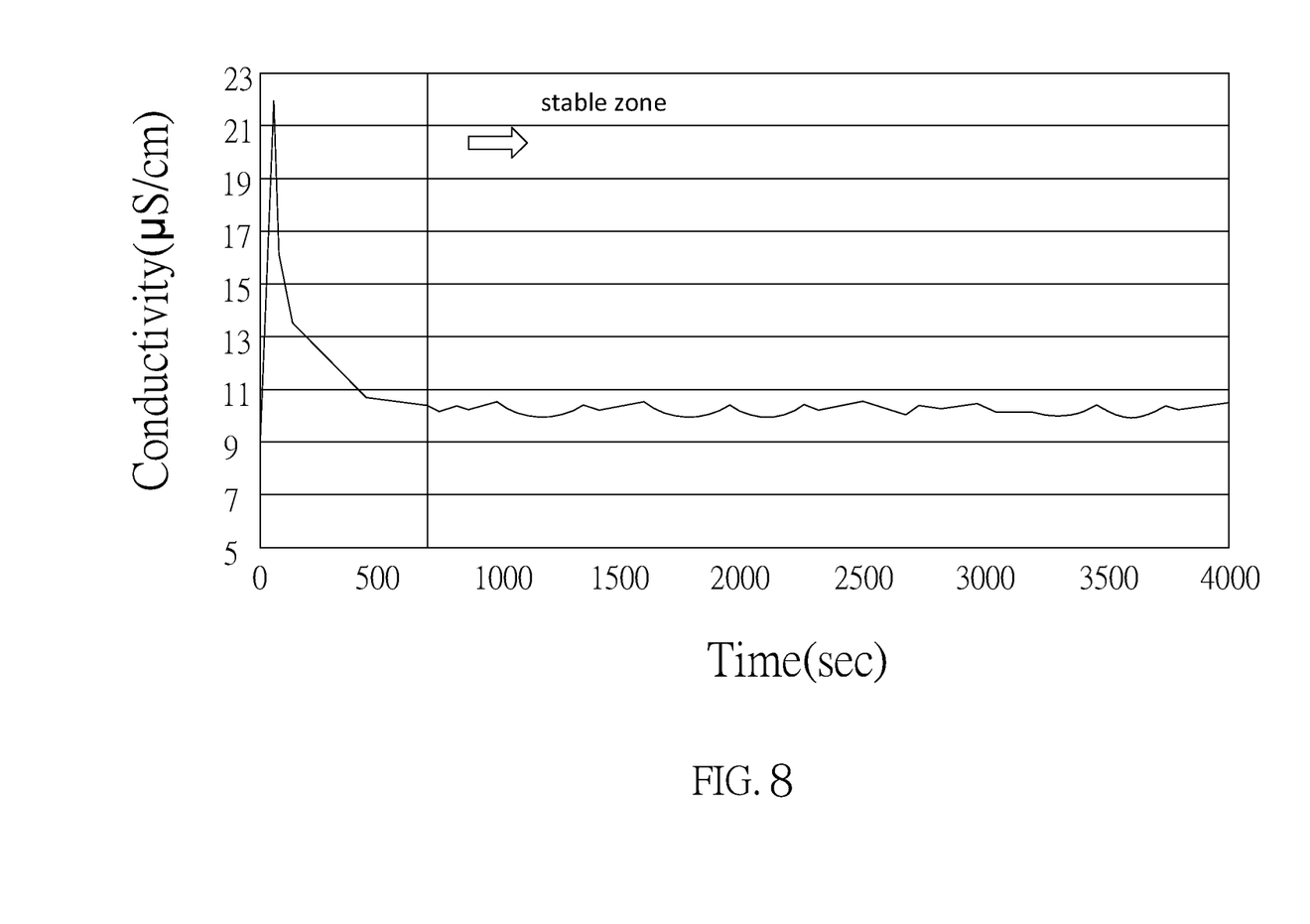
FIG. 8 is a trend line graph illustrating the conductivity of ammonia solution with respect to time, under a situation in which ammonia is continuously supplied.

Reference is then made to FIG. 8, which a trend line graph illustrating the conductivity of ammonia solution with respect to time, under a situation in which ammonia is continuously supplied. It can be seen from FIG. 8 that, in the initial period of the chemical liquid dilution system of the embodiment of the present invention, the concentration of the fluid in the diluted chemical liquid 40 is unstable, which results in the conductivity of the diluted chemical liquid 40 oscillating. About 720 seconds after the system has been started, the conductivity of the diluted chemical liquid 40 could be stably maintained at 10 µS/cm±3%. Furthermore, after the conductivity of the diluted chemical liquid 40 is stabilized, the error of the concentration of first solvent in the diluted chemical liquid 40 could be controlled within 5%.

Figure 9:
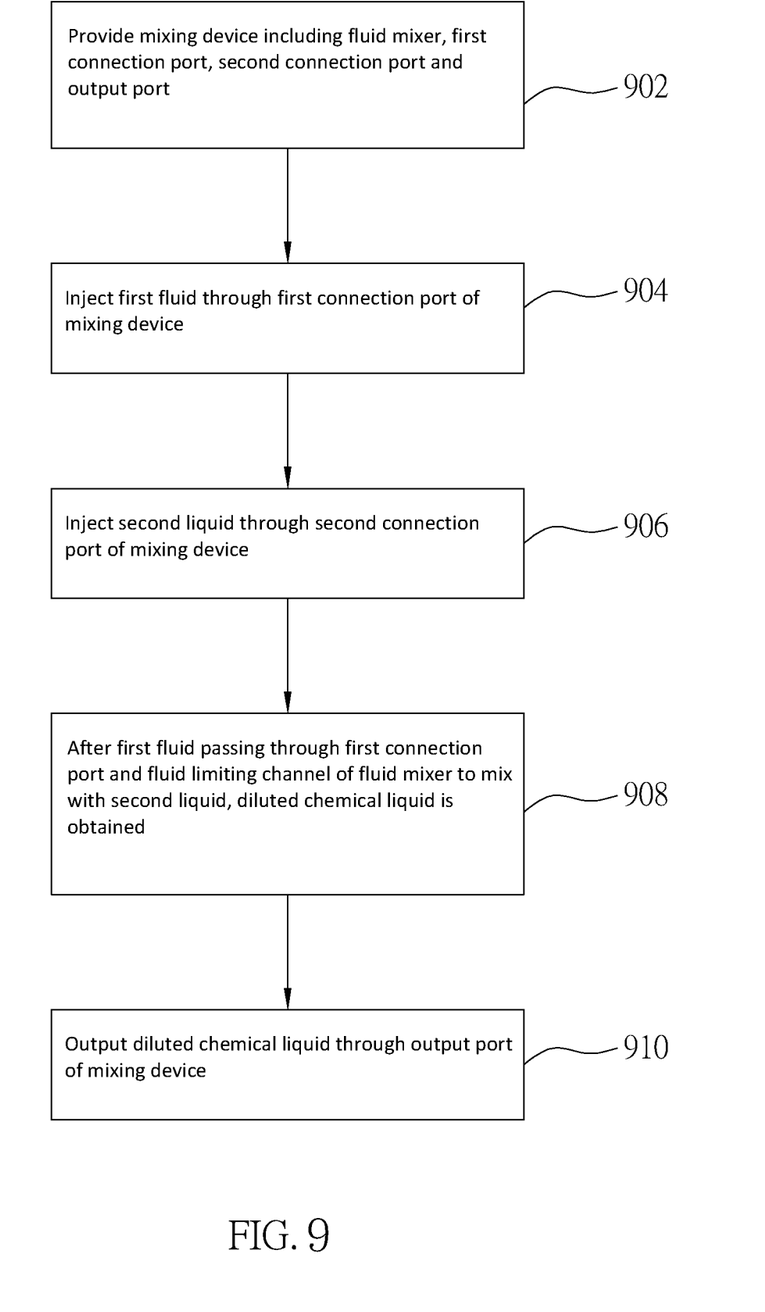
FIG. 9 is a flowchart illustrating the chemical liquid dilution method according to the embodiment of the present invention.

Reference is next made to FIGS. 1, 2, and 9. FIG. 9 is a flowchart illustrating the chemical liquid dilution method of an embodiment in accordance with the present invention. As shown in FIG. 9, the following steps are described: Step 902, provides a mixing device 30 including a fluid mixer 32, a first connection port 30a, a second connection port 30b, and an output port 30c, wherein the fluid mixer 32 has a fluid limiting channel 3222 with an interface 3222a communicating with the first connection port 30a and the other interface 3222b communicating with the second connection port 30b and the output port 30c; Step 904, inject a first fluid through the first connection port 30a of the mixing device 30; Step 906, inject a liquid through the second connection port 30b of the mixing device 30; Step 908, mix the fluid with the liquid after the fluid passes through the first connection port 30a and the fluid limiting channel 32222 of the fluid mixer 30, so to obtain a diluted chemical liquid 40; and Step 910, discharge the diluted chemical liquid 40 through the output port 30c of the mixing device 30.

The fluid mixer 32 includes a connection member 322, a connection cover 324, and a Y-shaped connector 326. The connection cover 324 is respectively connected to the connection member 322 and the Y-shaped connector 326, wherein the first connection port 30a is located on the connection cover 324. The Y-shaped connector 326 has the second connection port 30b, the output port 30c, and the cavity 3262. The second connection port 30b, the output port 30c and the cavity 3262 communicate with one another. The connection member 322 has the fluid limiting channel 3222, an input port 3224, and an output port 3226. The connection member 322 is connected to the connection cover 324 through the input port 3224, and the output port 3226 of the connection member 322 is located in the cavity 3262 of the Y-shaped connector 326. After the fluid passes through the first connection port 30a and the fluid limiting channel 3222, the fluid mixes with the liquid in the cavity 3262 of the Y-shaped connector 326, so that the diluted chemical liquid is obtained.

Figure 10:
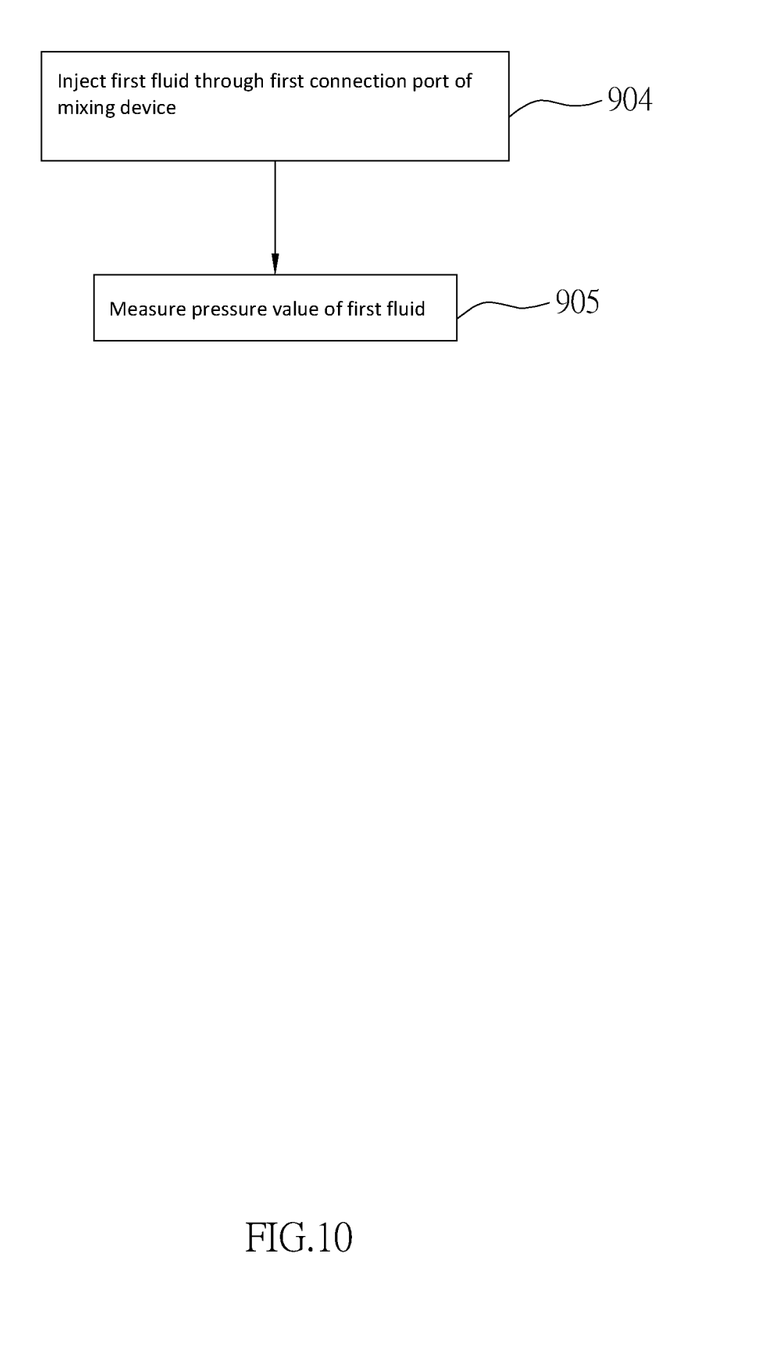
FIG. 10 is another flowchart illustrating the chemical liquid dilution method according to the embodiment of the present invention.
Figure 11:
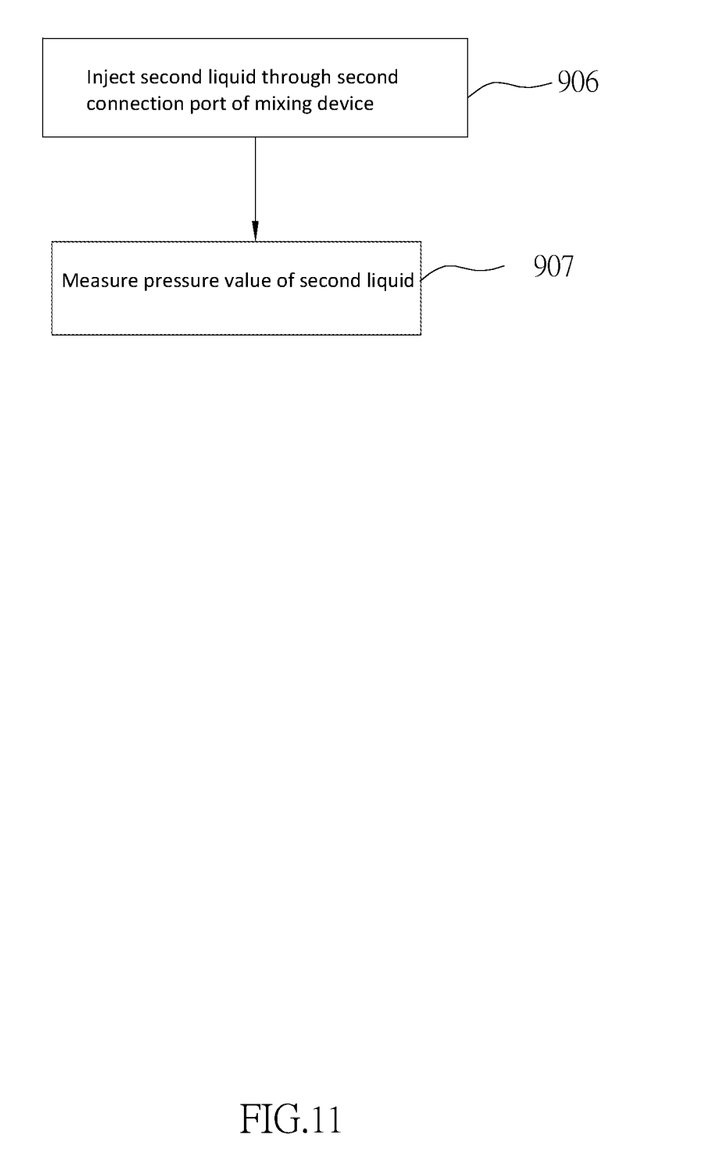
FIG. 11 is still another flowchart illustrating the chemical liquid dilution method according to the embodiment of the present invention.
Figure 12:
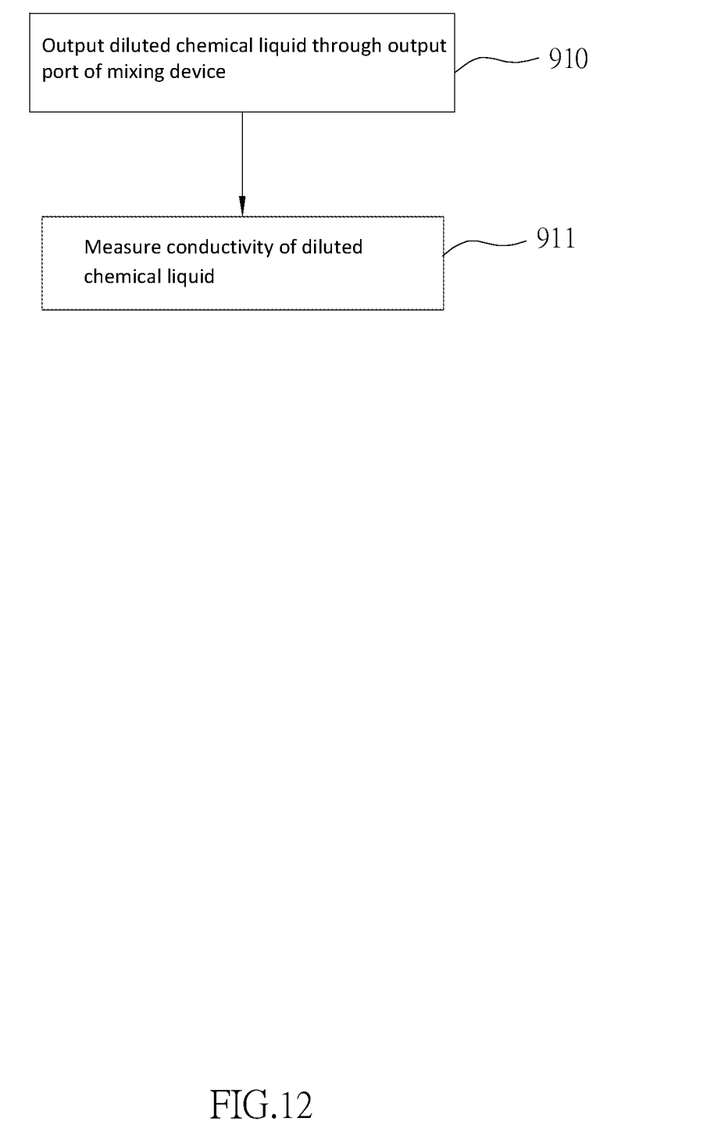
FIG. 12 is still another flowchart illustrating the chemical liquid dilution method according to the embodiment of the present invention.

As shown in FIG. 10, further including Step 905, measure the injection pressure of the fluid by the pressure meter 19 when the fluid is injected through the first connection port 30a of the mixing device 30. As shown in FIG. 11, further including Step 907, measure the injection pressure of the liquid by the pressure meter 25 when the liquid is injected through the second connection port 30b of the mixing device 30. As shown in FIG. 12, further including Step 911, measure the conductivity of the diluted chemical liquid 40 by the conductivity meter 38 after the liquid 40 is discharged through the output port 30c of the mixing device 30. In the present embodiment, the conductivity of the diluted chemical liquid could be adjusted by controlling the injection pressure of the fluid and the injection pressure of the liquid. In the present embodiment, the injection pressure of the fluid is greater than or equal to 5 psi.

With the aforementioned design, by using pressure control, and by injecting fluid through the Venturi effect generated by the fluid mixer, and by mixing up the micro amount of fluid and liquid, the diluted chemical liquid could have ppm level concentration. For example, the chemical liquid dilution system and method thereof are capable of instantly formulating functional water (ammonia solution) with 2-3 ppm for washing wafers. In this way, wasting a huge amount of deionized water to formulate excessive diluted chemical liquid could be prevented. On the other hand, the chemical liquid dilution system and method of the present invention are capable of making chemical liquids formulated by the present invention to be maintained at a certain desired concentration for a long period, which helps to improve the stability of parts of high-tech products.

It must be pointed out that the embodiments described above are only some preferred embodiments of the present invention. All equivalent structures and methods which employ the concepts disclosed in this specification and the appended claims should fall within the scope of the present invention.

What is claimed is:
1. A chemical liquid dilution system, comprising:
   a first material offering device, configured to provide a fluid;
   a second material offering device, configured to provide a liquid; and a mixing device including a fluid mixer, a first connection port, a second connection port, and an output port; wherein the fluid mixer has a fluid limiting channel with an interface communicating with the first connection port and another interface communicating with the second connection port and the output port, the first connection port is connected to the first material offering device, and the second connection port is connected to the second material offering device; after the fluid passes through the first connection port and the fluid limiting channel, the fluid mixes up with the liquid to form a diluted chemical liquid, and the output port discharges the diluted chemical liquid;

wherein the fluid mixer includes a connection member, a Y-shaped connector, and a connection cover, the connection cover is directly mechanically connected to both the connection member and the Y-shaped connector; the connection member has the fluid limiting channel, and the first connection port is located on the connection cover; the Y-shaped connector has the second connection port, the output port, and a cavity, wherein the second connection port, the output port, and the cavity communicate with one another.

2. The chemical liquid dilution system as claimed in claim 1, wherein the connection member has an input port and an output port; the connection member is connected to the connection cover through the input port, and the output port of the connection member is located in the cavity of the Y-shaped connector.

3. The chemical liquid dilution system as claimed in claim 1, wherein a portion of the connection cover is located between the connection member and the Y-shaped connector.

4. The chemical liquid dilution system as claimed in claim 1, wherein an input port of the connection member is in cylindrical shape, and the connection cover has an inner round slot; the input port of the connection member is correspondingly connected to the inner round slot of the connection cover.

5. The chemical liquid dilution system as claimed in claim 1, wherein the connection cover has an outer round wall, and the Y-shaped connector has an inner round opening; the outer round wall of the connection cover is correspondingly connected to the inner round opening of the Y-shaped connector.

6. The chemical liquid dilution system as claimed in claim 1, wherein the second connection port is perpendicular to the first connection port and the output port.

7. The chemical liquid dilution system as claimed in claim 1, wherein the interface of the fluid limiting channel has a first diameter, and the another interface of the fluid limiting channel has a second diameter; the first diameter is greater than the second diameter.

8. The chemical liquid dilution system as claimed in claim 7, wherein a range of the second diameter is between 0.01 mm and 0.1 mm.

9. The chemical liquid dilution system as claimed in claim 8, wherein the range of the second diameter is between 0.04 mm and 0.07 mm.

10. The chemical liquid dilution system as claimed in claim 1, wherein the fluid limiting channel includes a pinhole channel.

11. A chemical liquid dilution method, comprising:
providing a mixing device including a fluid mixer, a first connection port, a second connection port, and an output port, wherein the fluid mixer has a fluid limiting channel with an interface communicating with the first connection port and another interface communicating with the second connection port and the output port;
injecting a fluid through the first connection port of the mixing device;
injecting a liquid through the second connection port of the mixing device;
mixing the fluid with the liquid to obtain a solution of a diluted chemical liquid after the fluid passes through the first connection port and the fluid limiting channel of the fluid mixer, wherein the fluid is a solute and the liquid is a solvent; and
discharging the diluted chemical liquid through the output port of the mixing device;
wherein the fluid mixer includes a connection member, a Y-shaped connector, and a connection cover, the connection cover is directly mechanically connected to both the connection member and the Y-shaped connector, the connection member has the fluid limiting channel, and the first connection port is located on the connection cover; the Y-shaped connector has the second connection port, the output port, and a cavity, and wherein the second connection port, the output port, and the cavity communicate with one another;
wherein the interface of the fluid limiting channel has a first diameter, and the another interface of the fluid limiting channel has a second diameter; the first diameter is greater than the second diameter; and
wherein a range of the second diameter is between 0.01 mm and 0.1 mm.

12. The chemical liquid dilution method as claimed in claim 11, wherein the connection member has the fluid limiting channel, an input port, and an output port; the connection member is connected to the connection cover through the input port, and the output port of the connection member is located in the cavity of the Y-shaped connector; after the fluid passes through the first connection port and the fluid limiting channel, the fluid mixes with the liquid to form a diluted chemical liquid, and the output port discharges the diluted chemical liquid.

13. The chemical liquid dilution method as claimed in claim 11, wherein the step of injecting the fluid through the first connection port of the mixing device further includes controlling an injection pressure of the fluid and an injection pressure of the liquid, thereby to control a conductivity of the diluted chemical liquid.

14. The chemical liquid dilution method as claimed in claim 13, wherein the injection pressure of the fluid is greater than or equal to 5 psi.

* * * * *